(12) United States Patent
Fukui et al.

(10) Patent No.: US 10,574,952 B2
(45) Date of Patent: Feb. 25, 2020

(54) IMAGE PROJECTION APPARATUS, PROJECTION IMAGING SYSTEM, AND CORRECTION METHOD

(71) Applicant: SONY CORPORATION, Tokyo (JP)

(72) Inventors: Kenichi Fukui, Tokyo (JP); Atsuhiro Chiba, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/095,152

(22) PCT Filed: Mar. 21, 2017

(86) PCT No.: PCT/JP2017/011095
§ 371 (c)(1),
(2) Date: Oct. 19, 2018

(87) PCT Pub. No.: WO2017/187842
PCT Pub. Date: Nov. 2, 2017

(65) Prior Publication Data
US 2019/0141302 A1    May 9, 2019

(30) Foreign Application Priority Data

Apr. 27, 2016    (JP) .................................. 2016-089058

(51) Int. Cl.
*H04N 9/31*    (2006.01)
(52) U.S. Cl.
CPC ......... *H04N 9/3182* (2013.01); *H04N 9/3194* (2013.01)
(58) Field of Classification Search
CPC ...... H04N 9/3182; H04N 9/3144; H04N 9/31; H04N 17/04

USPC .......................................................... 348/189
See application file for complete search history.

(56) References Cited

U.S. PATENT DOCUMENTS

| | | | | |
|---|---|---|---|---|
| 5,532,765 A | * | 7/1996 | Inoue ....................... | H04N 9/28 348/177 |
| 8,094,196 B2 | * | 1/2012 | Okamoto ............. | H04N 17/004 348/177 |
| 8,451,389 B2 | * | 5/2013 | Aragaki ............... | H04N 9/3105 348/745 |
| 2005/0068466 A1 | * | 3/2005 | Waters ..................... | H04N 9/28 348/745 |
| 2008/0024684 A1 | * | 1/2008 | Park ........................ | H04N 5/74 348/745 |

(Continued)

FOREIGN PATENT DOCUMENTS

| | | |
|---|---|---|
| JP | 07-038902 A | 2/1995 |
| JP | 2006-162808 A | 6/2006 |
| JP | 2007-267284 A | 10/2007 |

(Continued)

*Primary Examiner* — Michael Lee
(74) *Attorney, Agent, or Firm* — Chip Law Group

(57) ABSTRACT

This image projection apparatus includes a measurement image that is for measurement of positional displacement between a plurality of colors serving as projection fundamental colors, and a projection section that projects the measurement image toward a projection plane. The measurement image has a plurality of unit images each including graphics of the respective plurality of colors, and the graphics of the respective plurality of colors in each of the unit images have respective barycentric positions that are substantially coincident.

17 Claims, 14 Drawing Sheets

(56) References Cited

U.S. PATENT DOCUMENTS

2013/0141593 A1\* 6/2013 Bassi .................. H04N 9/3147
   348/188
2014/0168525 A1\* 6/2014 Hasegawa .............. H04N 9/317
   348/745

FOREIGN PATENT DOCUMENTS

| JP | 2008-113416 A | 5/2008 |
| JP | 2013-021674 A | 1/2013 |
| JP | 2015-173339 A | 10/2015 |
| WO | 2009/142015 A1 | 11/2009 |

\* cited by examiner

[ FIG. 1 ]
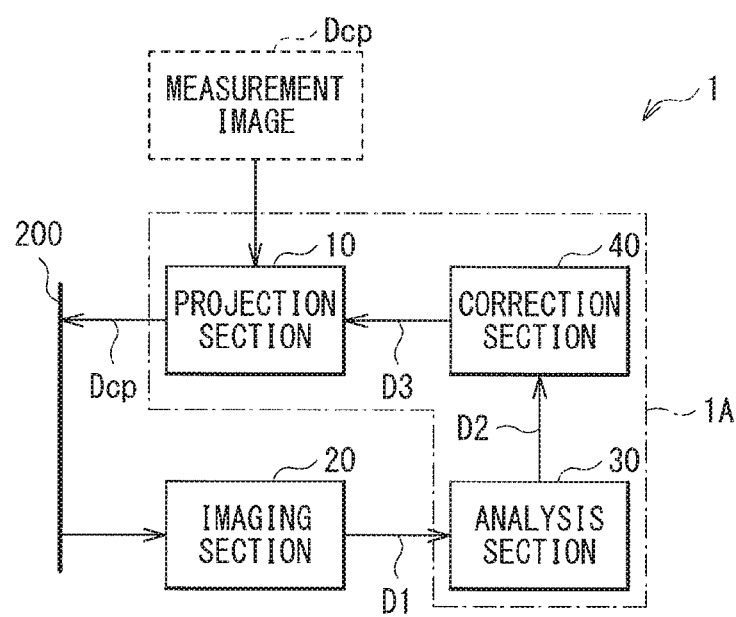

[ FIG. 2 ]
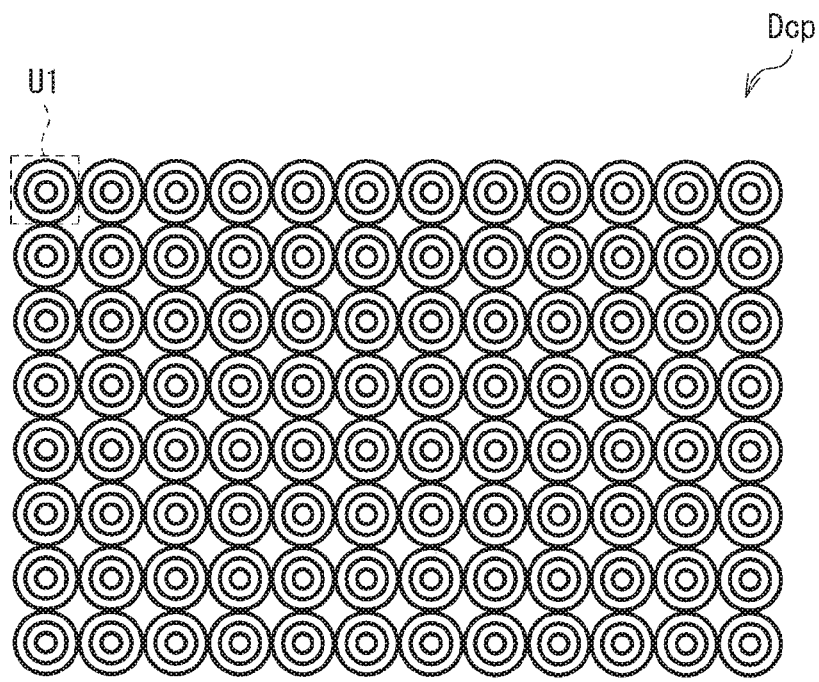
[ FIG. 3 ]
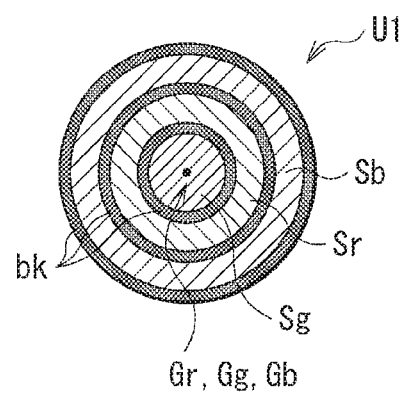

[ FIG. 4 ]
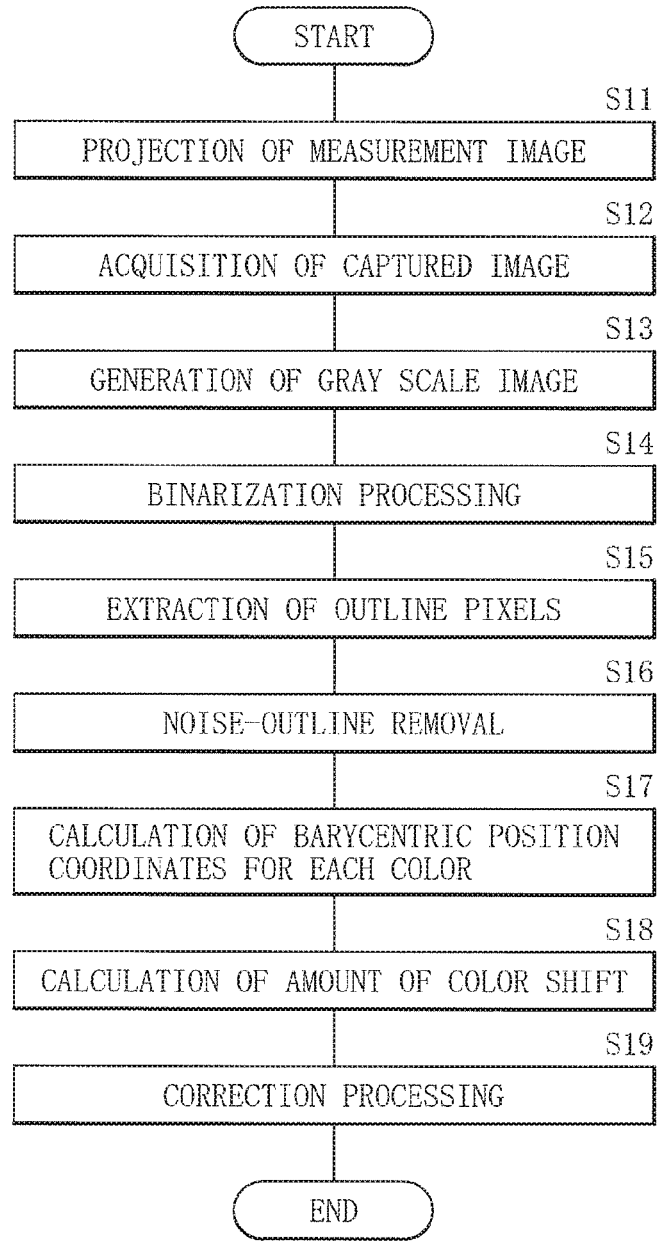

[FIG. 5]
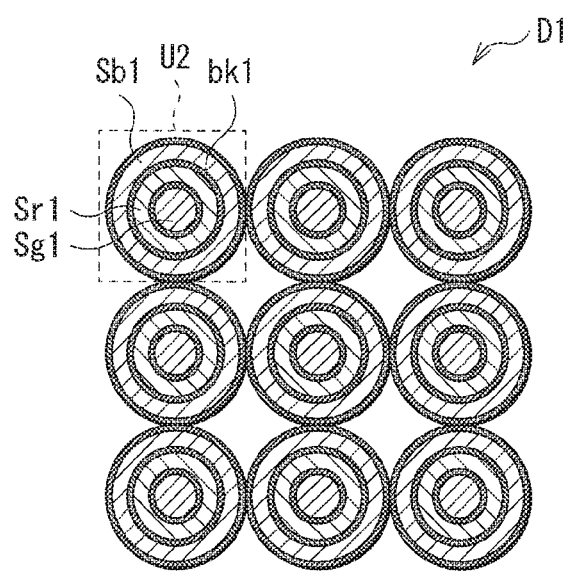

[ FIG. 6A ]
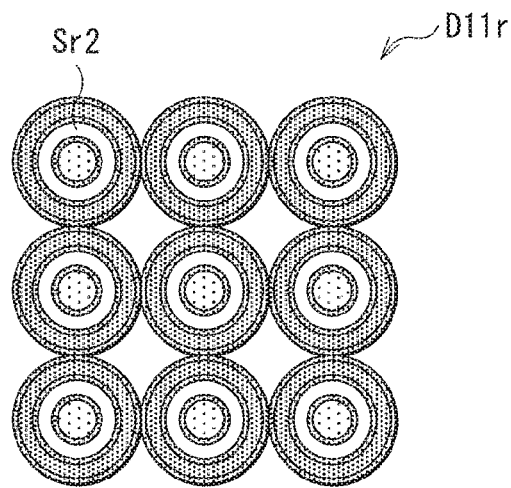
[ FIG. 6B ]
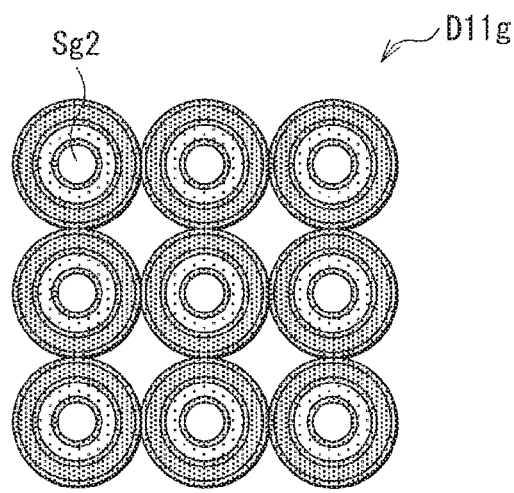
[ FIG. 6C ]
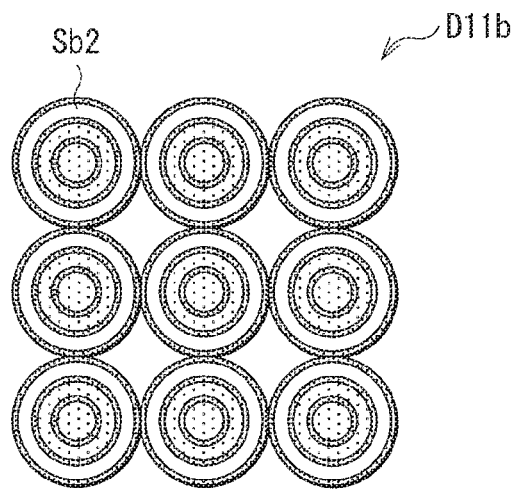

[ FIG. 7A ]
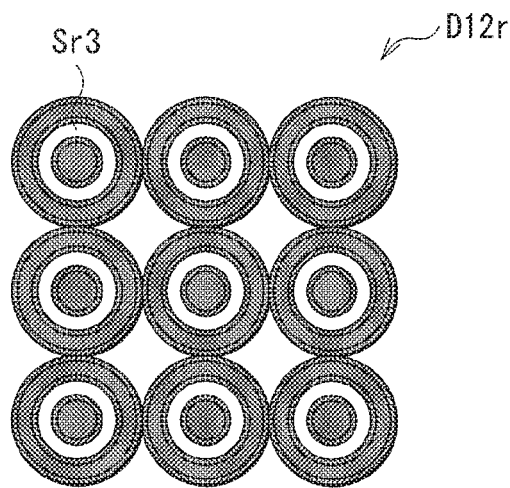
[ FIG. 7B ]
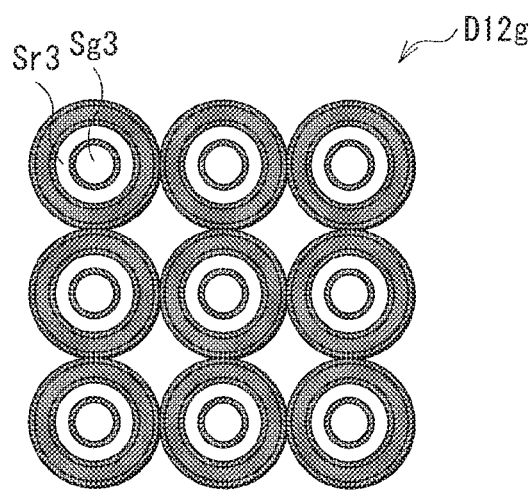
[ FIG. 7C ]
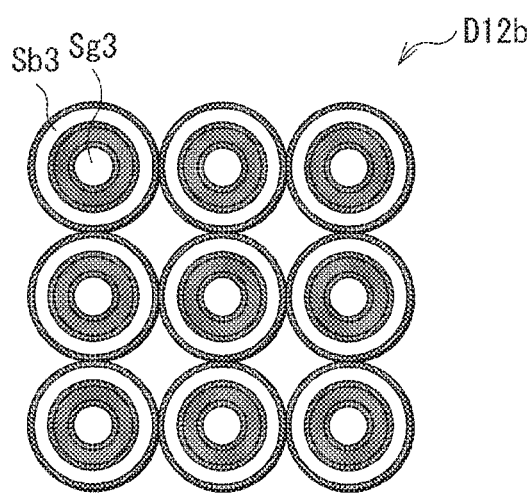

[ FIG. 8 ]
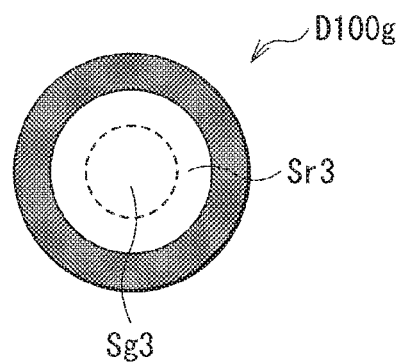
[ FIG. 9 ]
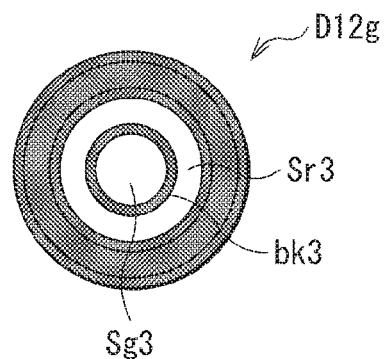

[ FIG. 10 ]
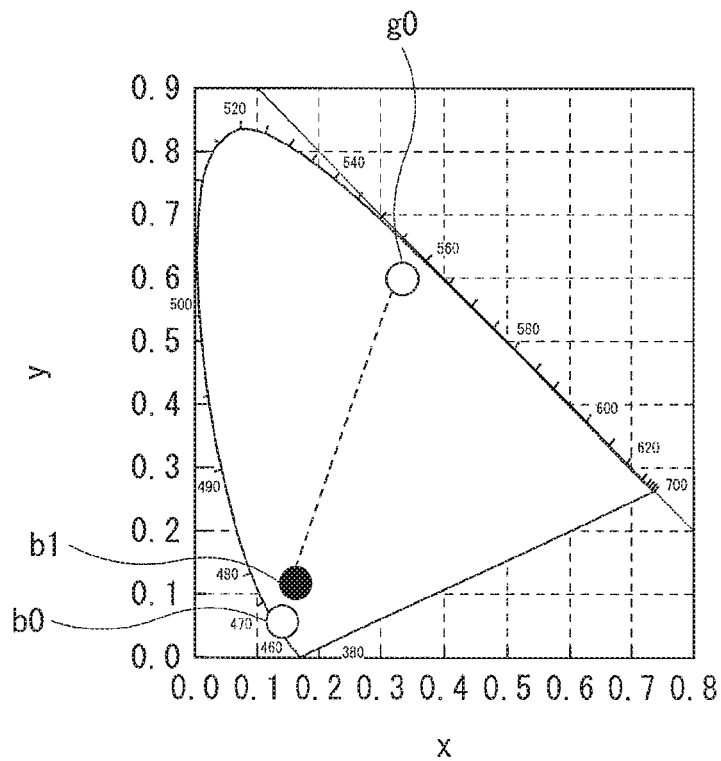
[ FIG. 11 ]
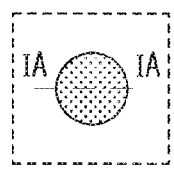
PROJECTED IMAGE (b1)
[ FIG. 12A ]
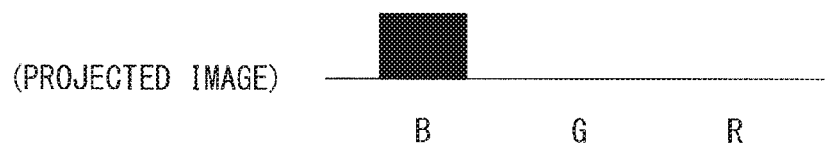
(PROJECTED IMAGE)
[ FIG. 12B ]
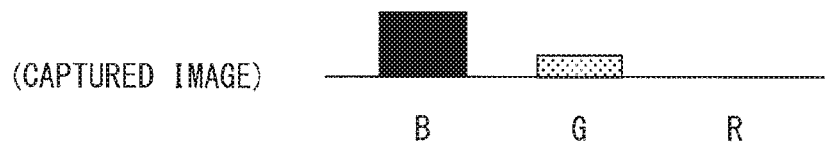
(CAPTURED IMAGE)

[ FIG. 13 ]
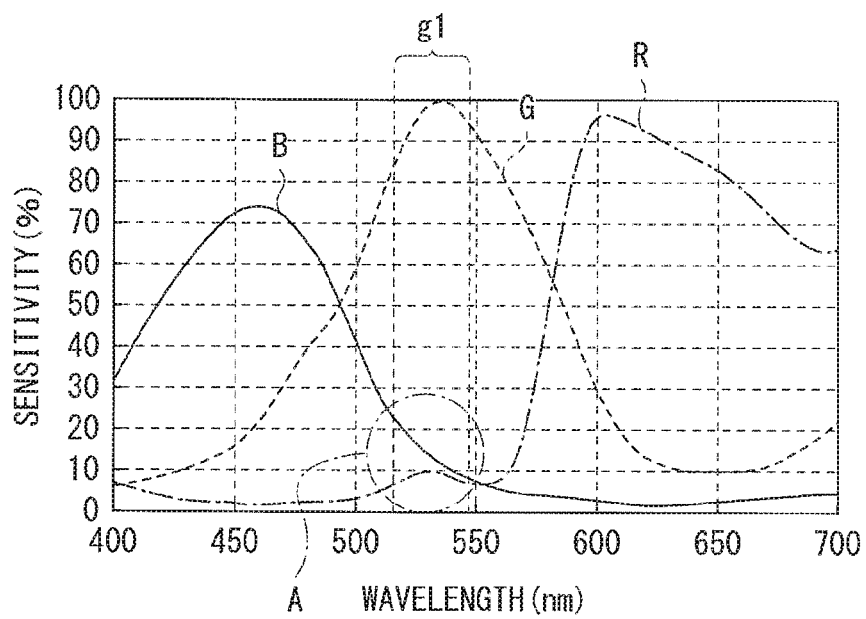
[ FIG. 14 ]
PROJECTED IMAGE (g1)
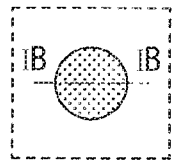
[ FIG. 15A ]
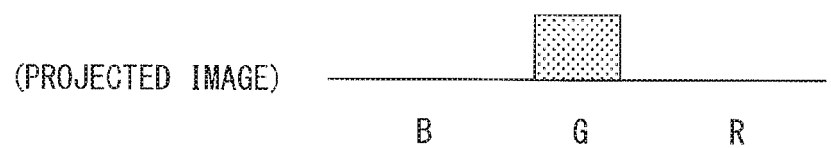
(PROJECTED IMAGE)
[ FIG. 15B ]
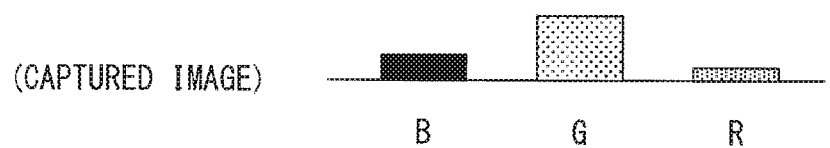
(CAPTURED IMAGE)

[ FIG. 16 ]
PROJECTED IMAGE
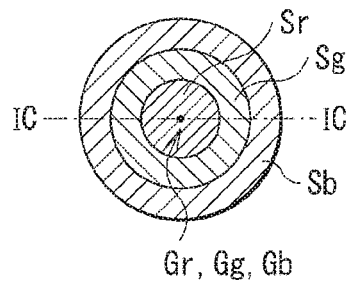
[ FIG. 17 ]
PROJECTED IMAGE
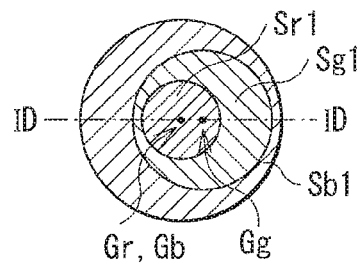
[ FIG. 18 ]
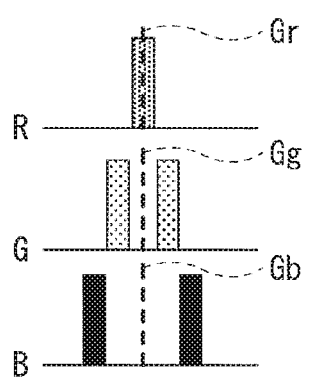
(PROJECTED IMAGE)
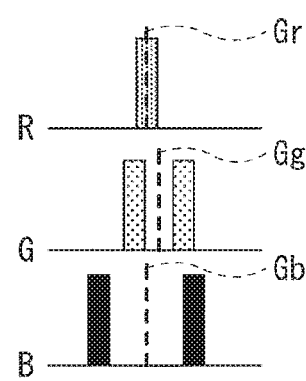
(PROJECTED IMAGE)
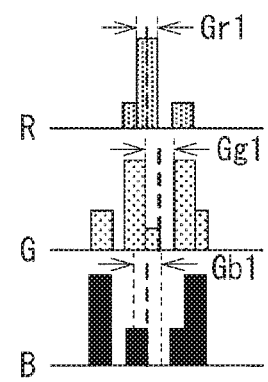
(CAPTURED IMAGE)

[ FIG. 19 ]
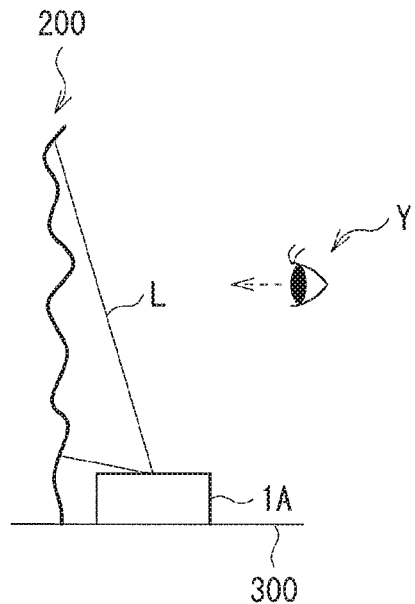
[ FIG. 20 ]
MEASUREMENT IMAGE
⊘ ⊘ ⊘ ⊘ ⊘ ⊘ ⊘ ⊘ ← R100
⊘ ⊘ ⊘ ⊘ ⊘ ⊘ ⊘ ⊘ ← G100
⊘ ⊘ ⊘ ⊘ ⊘ ⊘ ⊘ ⊘ ← B100
⊘ ⊘ ⊘ ⊘ ⊘ ⊘ ⊘ ⊘ ← R100
⊘ ⊘ ⊘ ⊘ ⊘ ⊘ ⊘ ⊘ ← G100
⊘ ⊘ ⊘ ⊘ ⊘ ⊘ ⊘ ⊘ ← B100

[ FIG. 21 ]
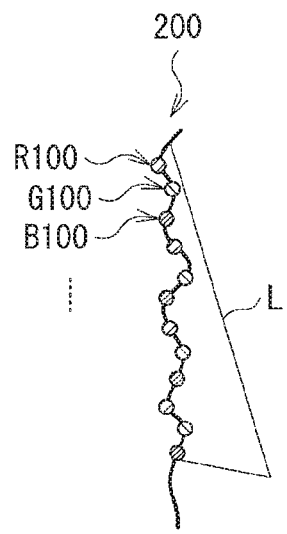
[ FIG. 22 ]
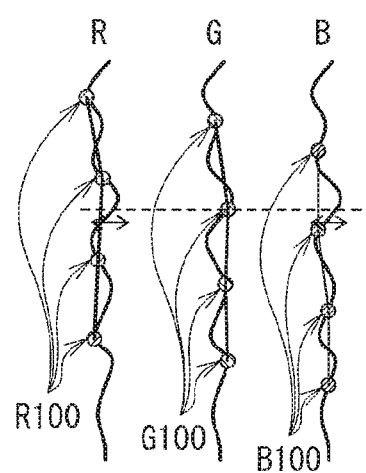

[ FIG. 23 ]
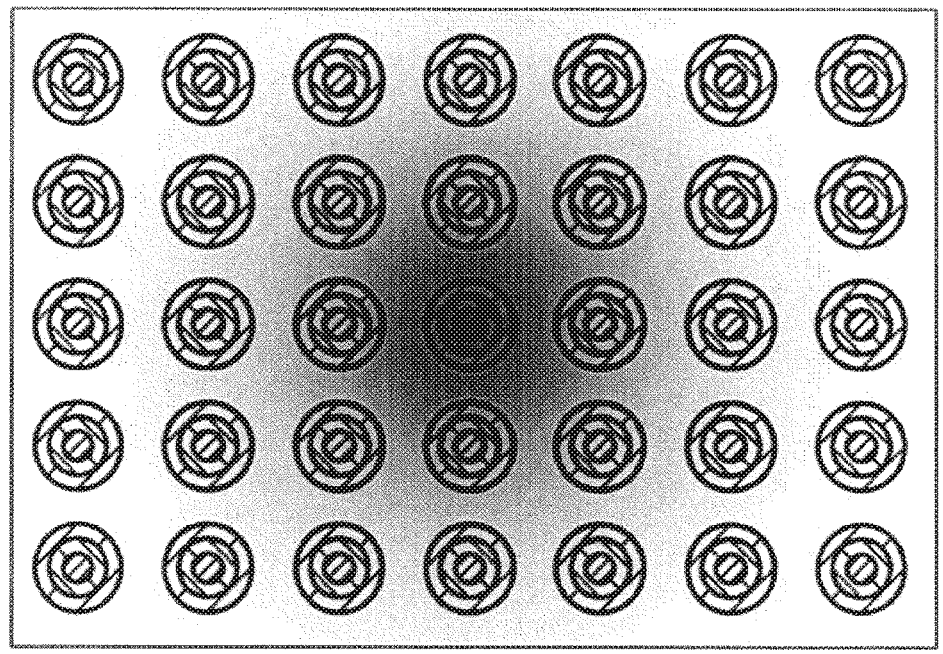
[ FIG. 24 ]
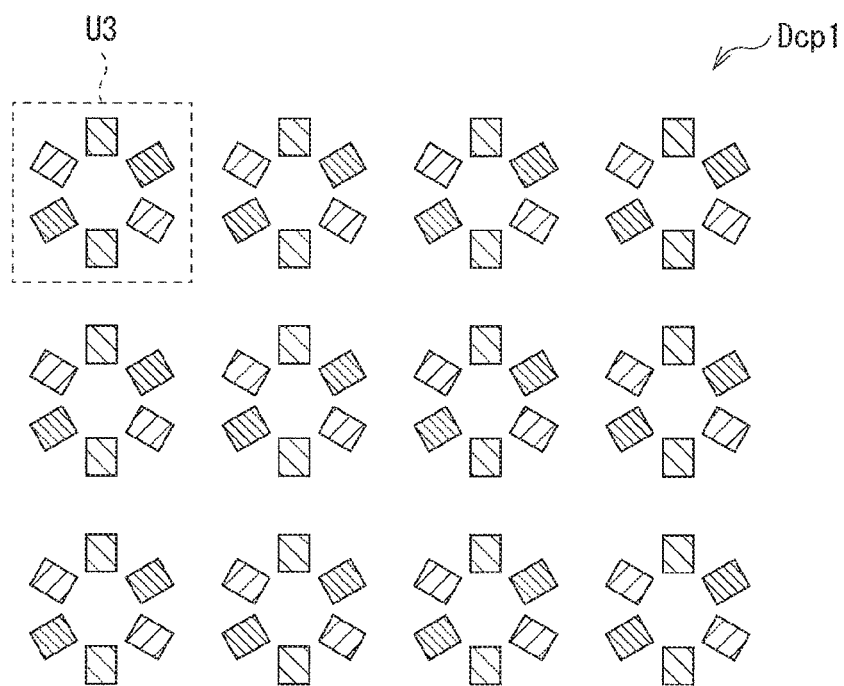

[ FIG. 25 ]
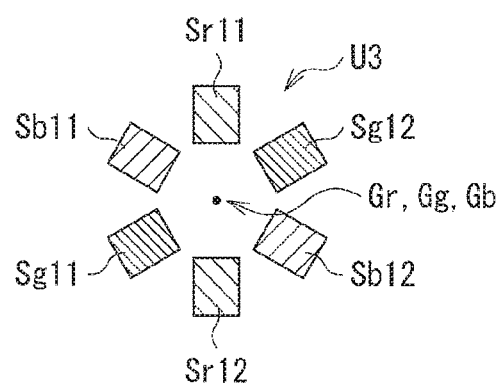

IMAGE PROJECTION APPARATUS, PROJECTION IMAGING SYSTEM, AND CORRECTION METHOD

CROSS REFERENCE TO RELATED APPLICATIONS

This application is a U.S. National Phase of International Patent Application No. PCT/JP2017/011095 filed on Mar. 21, 2017, which claims priority benefit of Japanese Patent Application No. JP 2016-089058 filed in the Japan Patent Office on Apr. 27, 2016. Each of the above-referenced applications is hereby incorporated herein by reference in its entirety.

TECHNICAL FIELD

The present disclosure relates to an image projection apparatus and a projection imaging system that project a color image, as well as a correction method that corrects an image for projection.

BACKGROUND ART

In an image projection apparatus such as a projector, a geometric distortion occurs in a projected image due to lens properties, irregularities of a projection plane, a projection angle with respect to the projection plane, etc. In addition, positional displacement between projection positions (hereinafter referred to as a color shift) may occur among projection fundamental colors (e.g., red, green, and blue), because of lens magnification chromatic aberration, etc. To address these, there is proposed a technique of projecting a pattern image onto a projection plane, imaging a projected screen formed thereby, and correcting an image distortion and a color shift on the basis of a captured image obtained by the imaging (e.g., PTL 1 to PTL 3).

CITATION LIST

Patent Literature

PTL 1: Japanese Unexamined Patent Application Publication No. 2015-173339
PTL 2: Japanese Unexamined Patent Application Publication No. 2006-162808
PTL 3: Japanese Unexamined Patent Application Publication No. 2013-21674

SUMMARY OF INVENTION

However, in the above-described technique, convenience of a user is poor in projecting a pattern image or imaging a projected screen, and thus an improvement is desired.

It is desired to achieve an image projection apparatus, a projection imaging system, and a correction method that make it possible to enhance convenience of a user.

An image projection apparatus according to an embodiment of the present disclosure includes a measurement image that is for measurement of positional displacement between a plurality of colors serving as projection fundamental colors, and a projection section that projects the measurement image toward a projection plane. The measurement image has a plurality of unit images each including graphics of the respective plurality of colors, and the graphics of the respective plurality of colors in each of the unit images have respective barycentric positions that are substantially coincident.

In the image projection apparatus according to the embodiment of the present disclosure, the measurement image projected by the projection section toward the projection plane has the plurality of unit images each including the graphics of the respective plurality of colors, and in this unit image, the graphics of the respective plurality of colors have the respective barycentric positions that are substantially coincident. This makes it possible to measure a color shift without, for example, projecting a measurement image for each of a plurality of colors. In other words, a measurement image may be not prepared for each color and may be prepared for one type for a plurality of colors.

A projection imaging system according to an embodiment of the present disclosure includes a projection section that projects, toward a projection plane, a measurement image that is for measurement of positional displacement between a plurality of colors serving as projection fundamental colors, and an imaging section that images a projected screen on which the measurement image is projected. The measurement image has a plurality of unit images each including graphics of the respective plurality of colors, and the graphics of the respective plurality of colors in each of the unit images have respective barycentric positions that are substantially coincident.

In the projection imaging system according to the embodiment of the present disclosure, the measurement image projected by the projection section toward the projection plane has the plurality of unit images each including the graphics of the respective plurality of colors, and in this unit image, the graphics of the respective plurality of colors have the respective barycentric positions that are substantially coincident. This makes it possible to measure a color shift without, for example, projecting a measurement image for each of a plurality of colors, and without performing imaging for each color. In other words, it is not necessary to prepare a measurement image for each color and only one type of measurement image may be prepared for a plurality of colors, thereby making it possible to reduce the number of imaging times as well.

A correction method according to an embodiment of the present disclosure includes projecting, toward a projection plane, a measurement image that is for measurement of positional displacement between a plurality of colors serving as projection fundamental colors, imaging a projected screen on which the measurement image is projected, and correcting an image to be projected, on a basis of a captured image of the projected screen. The measurement image has a plurality of unit images each including graphics of the respective plurality of colors, and the graphics of the respective plurality of colors in each of the unit images have respective barycentric positions that are substantially coincident.

In the correction method according to the embodiment of the present disclosure, the measurement image projected toward the projection plane has the plurality of unit images each including the graphics of the respective plurality of colors, and in this unit image, the graphics of the respective plurality of colors have the respective barycentric positions that are substantially coincident. This makes it possible to measure a color shift and to perform correction without, for example, projecting a measurement image for each of a plurality of colors, and without performing imaging for each color. In other words, it is not necessary to prepare a measurement image for each color and only one type of measurement image may be prepared for a plurality of colors, thereby making it possible to reduce the number of imaging times as well.

According to the image projection apparatus of the embodiment of the present disclosure, the measurement image projected by the projection section toward the projection plane has the plurality of unit images each including the graphics of the respective plurality of colors, and in this unit image, the graphics of the respective plurality of colors have the respective barycentric positions that are substantially coincident. This makes it possible to measure a color shift without, for example, projecting a measurement image for each of a plurality of colors. It is therefore possible to enhance convenience of a user.

According to the projection imaging system of the embodiment of the present disclosure, the measurement image projected by the projection section toward the projection plane has the plurality of unit images each including the graphics of the respective plurality of colors, and in this unit image, the graphics of the respective plurality of colors have the respective barycentric positions that are substantially coincident. This makes it possible to measure a color shift without, for example, projecting a measurement image for each of a plurality of colors, and without performing imaging for each color. In particular, in a case where imaging of a projected screen is to be performed for each color, the imaging is performed while an imaging section is fixed using a tripod etc., which is poor in convenience. In contrast, using the measurement image including the unit image as described above makes it possible to measure a color shift in one imaging. It is therefore possible to enhance convenience of a user.

According to the correction method of the embodiment of the present disclosure, the measurement image projected toward the projection plane has the plurality of unit images each including the graphics of the respective plurality of colors, and in this unit image, the graphics of the respective plurality of colors have the respective barycentric positions that are substantially coincident. This makes it possible to measure a color shift and to perform correction without, for example, projecting a measurement image for each of a plurality of colors, and without performing imaging for each color. In particular, in a case where imaging of a projected screen is to be performed for each color, the imaging is performed while an imaging section is fixed using a tripod etc., which is poor in convenience. In contrast, using the measurement image including the unit image as described above makes it possible to measure a color shift in one imaging. It is therefore possible to enhance convenience of a user.

It is to be noted that the above-described content is an example of the present disclosure. Effects of the present disclosure are not limited to those described above, and may be other different effects or may further include other effects.

BRIEF DESCRIPTION OF DRAWINGS

FIG. 1 is a configuration diagram illustrating an example of an overall configuration of a projection imaging system with an image projection apparatus according to an embodiment of the present disclosure.

FIG. 2 is a schematic diagram illustrating an example of a measurement image.

FIG. 3 is a schematic diagram for description of details of a unit image illustrated in FIG. 2.

FIG. 4 illustrates a flow from projection of a measurement image to correction processing in the projection imaging system illustrated in FIG. 1.

FIG. 5 is a schematic diagram for description of an image (a captured image) captured by imaging a projected screen of a measurement image.

FIG. 6A is a schematic diagram illustrating a gray scale image corresponding to red color of the image in FIG. 5.

FIG. 6B is a schematic diagram illustrating a gray scale image corresponding to green color of the image in FIG. 5.

FIG. 6C is a schematic diagram illustrating a gray scale image corresponding to blue color of the image in FIG. 5.

FIG. 7A is a schematic diagram illustrating an image after binarization processing of the image in FIG. 6A.

FIG. 7B is a schematic diagram illustrating an image after binarization processing of the image in FIG. 6B.

FIG. 7C is a schematic diagram illustrating an image after binarization processing of the image in FIG. 6C.

FIG. 8 is a schematic diagram for description of an effect of the unit image illustrated in FIG. 3.

FIG. 9 is a schematic diagram for description of the effect of the unit image illustrated in FIG. 3.

FIG. 10 is a characteristic diagram for description about a color adjustment in a projection section.

FIG. 11 is a schematic diagram illustrating a projected image of blue color illustrated in FIG. 10.

FIG. 12A is a characteristic diagram illustrating RGB components of the projected image illustrated in FIG. 11.

FIG. 12B is a characteristic diagram illustrating RGB components of an image (a captured image) captured by imaging the projected image illustrated in FIG. 11.

FIG. 13 is a characteristic diagram illustrating an example of a spectral sensitivity characteristic in the imaging section.

FIG. 14 is a schematic diagram illustrating a projected image corresponding to green color.

FIG. 15A is a characteristic diagram illustrating RGB components of the projected image illustrated in FIG. 14.

FIG. 15B is a characteristic diagram illustrating RGB components of an image (a captured image) captured by imaging the projected image illustrated in FIG. 14.

FIG. 16 is a schematic diagram illustrating an example of a measurement image.

FIG. 17 is a schematic diagram for description of a color shift in a projected screen of the measurement image illustrated in FIG. 16.

FIG. 18 is a schematic diagram for description of a barycentric position for each color in a projected image, a projected screen, and a captured image.

FIG. 19 is a schematic diagram for description of a color shift attributable to a distortion of a projection plane.

FIG. 20 is a schematic diagram for description of a measurement image according to a comparative example.

FIG. 21 is a schematic diagram for description of a projected screen of the measurement image illustrated in FIG. 20.

FIG. 22 is a schematic diagram for description of interpolation processing based on a captured image of the projected screen illustrated in FIG. 21.

FIG. 23 is a schematic diagram for description of correction processing of a luminance distribution.

FIG. 24 is a schematic diagram illustrating a configuration of a measurement image according to a modification example 1.

FIG. 25 is a schematic diagram for description of details of a unit image illustrated in FIG. 24.

MODES FOR CARRYING OUT THE INVENTION

An embodiment of the present disclosure is described below in detail with reference to the drawings. It is to be noted that the description is given in the following order.
1. Embodiment (an example of an image projection apparatus with a projection section that projects a measurement image including a predetermined unit image)
2. Modification Example 1 (another example of a measurement image)
<Embodiment>
[Configuration]

FIG. 1 illustrates a configuration of a projection imaging system (a projection imaging system 1) with an image projection apparatus (an image projection apparatus 1A) according to an embodiment of the present disclosure. The projection imaging system 1 includes the image projection apparatus 1A and an imaging section 20. It is to be noted that the configuration described here is an example. In this example, a case where the image projection apparatus 1A includes an analysis section 30 (the analysis section 30 is provided within the image projection apparatus 1A) is described, but the analysis section 30 may be provided within the imaging section 20, not within the image projection apparatus 1A.

The image projection apparatus 1A includes, for example, a projection section 10, the analysis section 30, and a correction section 40. Further, this image projection apparatus 1A holds a measurement image (a measurement image Dcp) for measurement of positional displacement between projection positions (a color shift) out of a plurality of colors serving as projection fundamental colors. However, this measurement image Dcp may be inputted from outside. This image projection apparatus 1A is, for example, configured to project the measurement image Dcp (and an image for projection) toward a projection plane 200, to measure (detect) a color shift on the basis of a captured image D1 supplied from the imaging section 20, and to correct the image for projection on the basis of a result of this measurement (color shift information D2), under control of a control section not illustrated. A configuration of the measurement image Dcp is described later.

The projection section 10 is a projector module including, for example, an illumination section, a light valve, and a projection lens. The illumination section includes a light source. The light valve generates an image on the basis of illumination light outputted from the illumination section. The projection lens projects outgoing light outputted from this light valve toward the projection plane 200.

Although the projection lens used in this projection section 10 is not limited in particular, a correction method using the measurement image of the present embodiment is effective especially in a case where a so-called ultra-short-focus-type lens is used. The ultra-short-focus-type lens has a throw ratio (Throw Ratio) of, for example, 0.38 or less. Here, the throw ratio corresponds to a ratio between a distance from the projection lens to the projection plane 200 and a width of a projected screen formed on the projection plane 200.

The imaging section 20 is, for example, an imaging apparatus that enables transmission of the captured image D1 to the image projection apparatus 1A. Used as the imaging section 20 is, desirably, an electronic apparatus with a build-in camera that allows a user to capture an image of a projected screen while holding with a hand the electronic apparatus, e.g., a smartphone, a tablet-type personal computer, a mobile phone, a digital camera, etc. It is to be noted that, here, the imaging section 20 is described to be an electronic apparatus independent of the image projection apparatus 1A (the projection section 10), but the imaging section 20 may be built in the image projection apparatus 1A to form a single apparatus. Further, the imaging section 20 may have the analysis section 30 built therein.

The analysis section 30 is a signal processing section that measures a color shift on the basis of the captured image D1. As described later in detail, this analysis section 30 calculates barycentric position coordinates for each color on the basis of the captured image D1, and calculates an amount of positional displacement between colors from these barycentric position coordinates.

The correction section 40 is a signal processing section that corrects an image for projection on the basis of the color shift information D2. Further, this correction section 40 performs processing of correcting a luminance distribution of a projected screen and a captured image (suppresses luminance unevenness) as necessary.

It is to be noted that, in the projection imaging system of the present embodiment, the signal processing by the analysis section 30 and the correction section 40 is executed by a processor within the image projection apparatus 1A. However, the signal processing by the analysis section 30 may be executed by a processor within the imaging section 20. Further, the signal processing by the analysis section 30 and the correction section 40 may be executed in any other apparatus (e.g., a personal computer, etc.). Furthermore, there may be adopted a configuration in which processing up to the measurement processing of the color shift by the analysis section 30 is performed and the correction processing by the correction section 40 is not performed, depending on a user's demand.

It is possible to adopt, for example, a screen, a wall, a table, a floor, etc. as the projection plane 200. In a case where the ultra-short-focus-type lens is used as the projection lens of the projection section 10, for example, an image is projected from an oblique direction toward the projection plane 200, in a state where the image projection apparatus 1A is disposed near the projection plane 200.

(Measurement Image Dcp)

FIG. 2 illustrates an example of the measurement image Dcp. The measurement image Dcp is a pattern image for measurement of positional displacement between a plurality of colors serving as projection fundamental colors. Here, for example, three colors of red (R), green (G), and blue (B) are given as examples of the projection fundamental colors. The measurement image Dcp includes, for example, a plurality of unit images U1 disposed in a matrix. In this example, these plurality of unit images U1 are laid edge to edge (adjacent to one another). However, the unit images U1 may not be necessarily adjacent to one another.

FIG. 3 illustrates an enlarged image of the unit image U1. The unit image U1 includes a graphic of each of R, G, and B colors (a red graphic Sr, a green graphic Sg, and a blue graphic Sb). In the unit image U1, barycentric positions (Gr, Gg, and Gb) of the respective red graphic Sr, green graphic Sg, and the blue graphic Sb are substantially coincident. In this example, among the red graphic Sr, the green graphic Sg, and the blue graphic Sb, one of the graphics (e.g., the green graphic Sg) has a circular shape, and other graphics (e.g., the red graphic Sr and the blue graphic Sb) each have an annular shape that surrounds the circular shape. In detail, the red graphic Sr having the annular shape is disposed along an outer circumference of the green graphic Sg having the circular shape, and the blue graphic Sb having the annular shape is disposed along an outer circumference of this red graphic S.

This unit image U1 has a black region (a black region bk) on a border between graphics next to each other, among the red graphic Sr, the green graphic Sg, and the blue graphic Sb. In this example, the black region bk is disposed between each of a border between the green graphic Sg and the red graphic Sr and a border between the red graphic Sr and the blue graphic Sb. Further, in a case where a background (an image of a portion corresponding to a space between the unit images U1) of the measurement image Dcp is, for example, white, it is desirable that the black region bk be disposed also on an outer edge portion of the blue graphic Sb as illustrated in FIG. 3. It is to be noted that a combination of the green graphic Sg and the red graphic Sr and a combination of the red graphic Sr and the blue graphic Sb in this example each correspond to a specific example of a combination of a "first graphic" and a "second graphic" of the present disclosure.

The black region bk may be disposed on each of all of borders among the red graphic Sr, the green graphic Sg, and the blue graphic Sb, but may be disposed only on a border between the graphics of selective colors. In a case where the black region bk is disposed only on the border between the graphics of selective colors, it is effective to dispose the black region bk, especially on a border between adjacent colors forming a combination that easily causes inter-color crosstalk in a color-shift measurement process. For example, as described later in detail, the black region bk may be disposed on the border between the green graphic Sg and the red graphic Sr because the crosstalk relatively easily occurs between the green graphic Sg and the red graphic Sr. On the other hand, for example, in a case where the crosstalk on the border between the red graphic Sr and the blue graphic Sb is permissible, the black region bk may not be disposed on the border between the red graphic Sr and the blue graphic Sb. In this way, it is not necessary for the black region bk to be disposed constantly, and may be disposed depending on the degree of crosstalk between the colors. However, as in the present embodiment, using the black region bk in the measurement image Dcp makes it possible to calculate the barycentric position of each color with accuracy even in a case where the crosstalk occurs. In addition, it is possible to extract an outline of a graphic of each color with accuracy, even in a case where blurring occurs in an image during projection or imaging. It is therefore possible to enhance accuracy of measuring a color shift by disposing the black region bk.

The black region bk on the outer edge portion of the blue graphic Sb is disposed in consideration of the crosstalk with a background color. In a case where the background color is black or the crosstalk is permissible, this black region bk on the outer edge portion of the blue graphic Sb may not be disposed.

It is to be noted that the crosstalk between colors refers to, for example, a state where graphics after binarization processing are in contact with or partially overlap each other due to positional displacement, and thus are not distinguished from each other.

In this unit image U1, further, among the red graphic Sr, the green graphic Sg, and the blue graphic Sb, the graphics forming the combination of colors that easily causes the crosstalk are disposed to have a relatively large distance therebetween. In this example, the graphics are disposed in consideration of a case where the crosstalk between green and blue colors more easily occurs (is larger) than the crosstalk between red and blue colors or between red and green colors. The green graphic Sg and the blue graphic Sb of the present embodiment correspond to a specific example of a combination of a "third graphic" and a "fourth graphic" of the present disclosure.

As described above, in the unit image U1, desirably, a layout of the red graphic Sr, the green graphic Sg, the blue graphic Sb, and the black region bk is determined depending on a characteristic of crosstalk between the colors. This characteristic of crosstalk varies depending on a use environment of the projection section 10, the imaging section 20, the projection plane 200, or the like and a property of an apparatus, as described later. Hence, for example, desirably, information about this characteristic of crosstalk is acquired beforehand by other means, and the measurement image Dcp is determined on the basis of the acquired crosstalk information. Alternatively, a plurality of types of the measurement image Dcp may be prepared beforehand, and an optimum measurement image Dcp may be selected on the basis of the acquired crosstalk information. Further, a distance between arranged graphics of the respective colors may be determined beforehand by setting a permissible crosstalk range beforehand.

In the unit image U1, further, it is desirable that the red graphic Sr, the green graphic Sg, and the blue graphic Sb be disposed to have at least respective portions not to be coincident as a result of parallel displacement. In other words, in the unit image U1, the red graphic Sr, the green graphic Sg, and the blue graphic Sb have the respective portions that are not identical in shape, size, and orientation. Alternatively, the red graphic Sr, the green graphic Sg, and the blue graphic Sb are not identical in shape, size, and orientation. This is because, in a case where positional displacement occurs in the graphic of a specific color, when this graphic becomes completely coincident with or partially coincident with the graphic of any other color due to this positional displacement, it is difficult to calculate a barycentric position precisely.

In the unit image U1, further, it is desirable that, among the red graphic Sr, the green graphic Sg, and the blue graphic Sb, one of the graphics be disposed not to be included in any other graphic as a result of parallel displacement. This is because in a case where positional displacement occurs in the graphic of a specific color, when this graphic is included in the graphic of any other color, it is difficult to calculate a barycentric position precisely.

[Processing Operation]

A flow of color shift measurement and correction processing using the measurement image Dcp as described above is described below as operation of the image projection apparatus 1A and the projection imaging system. FIG. 4 illustrates an example of the flow.

First, the projection section 10 of the image projection apparatus 1A projects the measurement image Dcp including the unit image U1 as described above toward the projection plane 200 (step S11). Subsequently, the imaging section 20 acquires the captured image D1 by imaging a screen (a projected screen) of the measurement image Dcp projected onto the projection plane 200 (step S12).

FIG. 5 illustrates an example of the captured image D1. It is to be noted that FIG. 5 illustrates only a region (a region including 3×3 unit images) of a portion of the captured image D1, for simplification. In this way, the captured image D1 acquired by imaging the projected screen of the measurement image Dcp includes a unit image U2 corresponding to the unit image U1. As with the unit image U1, the unit image U2 is an image expressed in RGB and includes a red graphic (a red graphic Sr1), a green graphic (a green graphic Sg1), a blue graphic (a blue graphic Sb1), and a black region (a black region bk1). This captured image D1 is supplied to the analysis section 30 of the image projection apparatus 1A.

Subsequently, the analysis section 30 generates a gray scale image for each color on the basis of the inputted captured image D1 (step S13). Specifically, the captured image D1 is separated into images of the respective color components of R, G, and B, and then converted into the gray scale image that is expressed in scale on the basis of the color components of the respective images.

As an example, FIG. 6A illustrates a gray scale image (an image D11$r$) corresponding to red color, FIG. 6B illustrates a gray scale image (an image D11$g$) corresponding to green color, and FIG. 6C illustrates a gray scale image (an image D11$b$) corresponding to blue color. In the image D11$r$ illustrated in FIG. 6A, a graphic (a graphic Sr2) corresponding to the red graphic Sr1 in the unit image U2 of the captured image D1 is expressed with white, and other graphic portions are expressed with a gray to black scale depending on an amount of the red component. In the image D11$g$ illustrated in FIG. 6B, a graphic (a graphic Sg2) corresponding to the green graphic Sg1 in the unit image U2 of the captured image D1 is expressed with white, and other graphic portions are expressed with a scale from gray to black depending on an amount of the green color component. In the image D11$b$ illustrated in FIG. 6C, a graphic (a graphic Sb2) corresponding to the blue graphic Sb1 in the unit image U2 of the captured image D1 is expressed with white, and other graphic portions are expressed with a scale from gray to black depending on an amount of the blue color component.

Subsequently, the analysis section 30 performs binarization processing for each of these gray scale images D11$r$, D11$g$, and D11$b$ (step S14). Examples of the binarization processing include adaptive binarization processing using a predetermined threshold.

As an example, FIG. 7A illustrates an image (an image D12$r$) after the binarization processing of the image D11$r$, FIG. 7B illustrates an image (an image D12$g$) after the binarization processing of the image D11$g$, and FIG. 7C illustrates an image (an image D12$b$) after the binarization processing of the image D11$b$. In the image D12$r$ illustrated in FIG. 7A, a graphic (a graphic Sr3) corresponding to the red graphic Sr1 of the captured image D1 (the graphic Sr2 of the image D11$r$) is expressed with white and other graphic portions are expressed with black. In the image D12$g$ illustrated in FIG. 7B, a graphic (a graphic Sg3) corresponding to the green graphic Sg1 of the captured image D1 (the graphic Sg2 of the image D11$g$) and a graphic portion (the graphic Sr3) corresponding to the red graphic Sr1 of the captured image D1 are expressed with white, and other graphic portions are expressed with black. In the image D12$b$ illustrated in FIG. 7C, a graphic (a graphic Sb3) corresponding to the blue graphic Sb1 of the captured image D1 (the graphic Sb2 of the image D11$b$) and a graphic portion (the graphic Sg3) corresponding to the green graphic Sg1 of the captured image D1 are expressed with white, and other graphic portions are expressed with black.

In this way, after the binarization processing, for example, in the image D12$g$ generated on the basis of the green component, not only the graphic Sg3 corresponding to the green graphic Sg but also the graphic Sr3 corresponding to the red graphic Sr is expressed with white. Further, in the image D12$b$ generated on the basis of the blue component, not only the graphic Sb3 corresponding to the blue graphic Sb but also the graphic Sg3 corresponding to the green graphic Sg is expressed with white.

Subsequently, the analysis section 30 extracts an outline (outline pixels) on the basis of each of these images D12$r$, D12$g$, and D12$b$ that are after the binarization processing (step S15). Specifically, the analysis section 30 extracts a group of pixels forming a binary border in each of the images D12$r$, D12$g$, and D12$b$.

Next, the analysis section 30 performs noise-outline removal (step S16). Here, outline pixels configured by noise due to the crosstalk etc. are included in the extracted outline pixels. Such a noise outline is removed using an area, a shape, and color information (color information acquired by referring to the captured image D1) of a graphic surrounded by each outline. An outline of each of the graphics Sr3, Sg3, and Sb3 of the respective color components are thereby obtained.

At this time, because the unit image U1 of the measurement image Dcp includes the black region bk on the border between the graphics of the respective colors, it is easy to identify the outline, making it easier to remove the noise outline. Here, there is a case where it may be difficult to distinguish between regions of different colors after the binarization processing, if the measurement image does not include the black region bk. FIG. 8 illustrates an image D100$g$ corresponding to green color. The image D100$g$ is obtained by imaging a projected screen of a measurement image not including the black region bk (an image in a case where the black region bk is not disposed in the unit image illustrated in FIG. 3), and subjecting a captured image obtained thereby to the above-described binarization processing. In this image D100$g$, the graphic Sg3 corresponding to the green graphic Sg and the graphic Sr3 corresponding to the red graphic Sr are both expressed with white and it is difficult to distinguish a border between these graphics. For this reason, it is difficult to perform the noise-outline removal. In contrast, when the measurement image Dcp includes the black region bk as in the present embodiment, the black region bk3 is present on the border between the graphic Sg3 corresponding to the green graphic Sg and the graphic Sr3 corresponding to the red graphic Sr, in the image D12$g$ after the binarization processing. For this reason, it is possible to distinguish between the graphics Sg3 and Sr3, making it easier to perform the noise-outline removal.

Subsequently, the analysis section 30 calculates barycentric position coordinates for each color, on the basis of the information (positional information) of the outlines of the graphics Sr3, Sg3, and Sb3 of the respective color components (step S17). Afterward, an amount of positional displacement (an amount of a color shift) between the calculated barycentric position coordinates for the respective colors is calculated (step S18). The information (the color shift information D2) about the calculated amount of the color shift is supplied to the correction section 40.

Next, the correction section 40 corrects an image for projection on the basis of the inputted color shift information D2 (step S19). Specifically, a correction factor is calculated to reduce the positional displacement for each color, and image correction is performed using the calculated correction factor. For example, a two-dimensional correction vector map is used for the correction factor. An image (an image D3) after this correction is supplied to the projection section 10. This allows the projection section 10 to perform image display on the basis of the image D3 after the color shift correction, inputted from the correction section 40.

[Effects]

As described above, in the projection imaging system 1 of the present embodiment, the measurement image Dcp is projected onto the projection plane 200 by the projection section 10, and the projected screen formed thereby is imaged by the imaging section 20. On the basis of the captured image D1 obtained thereby, the amount of the color shift is measured by the analysis section 30. On the basis of the measured amount of the color shift, the image for projection is corrected by the correction section 40.

Here, in an ordinary image projection apparatus such as a projector, a geometric distortion occurs in a projected image due to lens properties, irregularities of a projection plane, a projection angle with respect to the projection plane, etc. In addition, a color shift as described above occurs because of lens magnification chromatic aberration, etc. To address these, there has been proposed up to now a technique of projecting a pattern image for measurement onto a projection plane, imaging a projected screen formed thereby, and correcting an image distortion and a color shift on the basis of a captured image obtained thereby (e.g., PTL 1 to PTL 3 described above).

For example, to correct a geometric distortion of a projected screen, the technique of PTL 1 uses a measurement image having a pattern including a binary triple concentric circle and a background that becomes the same color if a surface integral is performed. A projected screen of this measurement image is imaged, a captured image obtained thereby is subjected to smoothing processing, and a distortion of the projected screen is thereby detected. Further, in the technique of PTL 2, barycentric coordinates of each graphic are calculated by performing binarization processing on an image captured by imaging a projected screen of a measurement image, and a distortion is thereby detected. Furthermore, to correct a distortion and a color shift of a projected screen, the technique of PTL 3 projects a measurement image for each projection fundamental color, and analyzes an image captured for each color.

However, to measure an amount of a color shift by using these techniques, (several types of) measurement images are prepared for the respective colors. In addition, during imaging, a screen formed by projecting each of these measurement images for the respective colors is imaged. For this reason, in a case where calibration between imaging positions is not possible, an imaging apparatus is fixed with a tripod, etc., while imaging the projected screen is performed for each color. This reduces convenience of a user.

In contrast, in the present embodiment, it is possible to measure a color shift by using the measurement image Dcp including the unit image U1 in which the barycentric positions of the respective graphics of the respective colors as described above are coincident, without, for example, projecting the measurement image Dcp for each of a plurality of colors and without performing imaging for each color. In other words, it is not necessary to prepare the measurement image Dcp for each color (preparing only one type for a plurality of colors suffices). In addition, this reduces the number of imaging times as well (imaging once is sufficient) . In this way, in the present embodiment, it is possible to measure an amount of a color shift in one projection and imaging, and it is possible to perform color shift measurement and image correction by performing imaging, while, for example, holding the imaging apparatus (the imaging section 20) with a hand (in a hand-held state).

Here, even if projection fundamental colors of the image projection apparatus 1A (the projection section 10) and imaging fundamental colors of the imaging section 20 are, for example, the same red, green, and blue colors, the projected fundamental colors are not necessarily imaged directly as fundamental colors of the captured image. This is because the crosstalk occurs between the colors, due to color mixture of projection fundamental colors attributable to a light source spectrum characteristic or a color adjustment of the projection section 10, or a spectral sensitivity characteristic of the imaging section 20.

FIG. 10 is a characteristic diagram for description of the color adjustment in the projection section 10. For example, in a case where a chromaticity (b0) of a blue color light source and a chromaticity (b1) of blue color to be projected are different, the chromaticity b1 is adjusted by mixing green color (a chromaticity b0 of a green color light source) with blue color (the chromaticity b0) (by a color adjustment) in rendering of blue color. For this reason, in a case where an image (FIG. 11) of blue color (the chromaticity b1) after the color adjustment is projected, an image (FIG. 12A) expressed with the blue component (B) is so subjected to imaging as to include the green color component (G) as well, in a captured image (FIG. 12B). It is to be noted that FIG. 12A and FIG. 12B each schematically illustrate the RGB components along a line IA-IA in FIG. 11.

FIG. 13 is a characteristic diagram illustrating an example of the spectral sensitivity characteristic in the imaging section 20 (the imaging apparatus). In a case where an image (FIG. 14) of green color (a wavelength region g1) is projected, an image (FIG. 15A) expressed with the green component (G) is so subjected to imaging as to include the blue component (B) and the red component (R) as well in a captured image (FIG. 15B). This is because sensitivity of red and blue colors is not 0 (zero), with respect to the wavelength region g1 of the green color, as indicated by a region A in FIG. 13. It is to be noted that FIG. 15A and FIG. 15B each schematically illustrate the RGB components along a line IB-IB in FIG. 14.

For these reasons, in a case where color-shift measurement is performed in one projection and imaging, crosstalk of color may become a noise factor when detecting position coordinates of a graphic of each color. For example, a case is considered where a measurement image in which the green graphic Sg and the blue graphic Sb each having an annular shape are sequentially disposed around the red graphic Sr having a circular shape, as illustrated in FIG. 16. In this measurement image, the barycentric positions (Gr, Gg, and Gb) are assumed as being coincident. In a case where a projection position of the green graphic Sg1 is displaced laterally from other graphics (the red graphic Sr1 and the blue graphic Sb1) in a projected screen as illustrated in FIG. 17, positional displacement occurs which may cause the crosstalk between colors in a captured image obtained by imaging the projected screen. FIG. 18 schematically illustrates RGB components taken along a line IC-IC of a projected image in FIG. 16, RGB components taken along a line ID-ID of the projected screen in FIG. 17, and RGB components in the captured image obtained by imaging the projected screen. In this way, when the barycentric position of a graphic of a certain color in a projected screen is displaced, the positions of barycenters (Gr1, Gg1, and Gbl1 in a captured image are displaced, and this causes the crosstalk, thereby reducing accuracy of detecting position coordinates of a graphic of each color.

In contrast, in the measurement image Dcp of the present embodiment, the black region bk is disposed on each of the borders of the red graphic Sr, the green graphic Sg, and the blue graphic Sb in the unit image U1. This makes it possible to easily identify the border of a graphic of each color by performing processing such as the above-described noise-outline removal, even in a case where the crosstalk (as an example, the crosstalk between the graphics Sg3 and Sr3 illustrated in FIG. 7B) attributable to positional displacement of a specific color occurs due to, for example, the property of the projection section 10, the projected screen, or the imaging section 20.

Further, in the unit image U1, graphics forming a combination of colors that relatively easily causes the crosstalk are configured to have a relatively large distance therebetween. This makes it possible to avoid contact or a partial overlap between the graphics of colors that easily cause the crosstalk (as an example, the graphics Sg3 and Sb3 illustrated in FIG. 7C), even in a case where, for example, positional displacement of a specific color occurs due to, for example, the property of the projection section 10, the projected screen, or the imaging section 20. In other words, it is possible to prevent the crosstalk between these graphics Sg3 and Sb3.

FIG. 19 is a schematic diagram for description of a color shift attributable to a distortion of the projection plane 200. The ultra-short-focus-type lens is used in the image projection apparatus 1A. The image projection apparatus 1A is able to project image light L from an oblique direction to the projection plane 200 such as a wall, in a state of, for example, being placed on a floor 300. In such a case, when the projection plane 200 has irregularities, a distortion occurs in a projected screen formed by the image projection apparatus 1A. A case where a projected screen including such a distortion is imaged to measure a color shift is to be described.

In this case, a case is considered where, for example, a measurement image (a pattern image where red graphics R100, green graphics G100, and blue graphics B100 are discretely arranged) as illustrated in FIG. 20 is used. In a projected screen formed by projecting such a measurement image, graphics of each color are projected at discrete positions as illustrated in FIG. 21. For this reason, positional information between the graphics is determined by interpolation processing. In a case where there is an interpolation error, when a graphic position within the projected screen changes, a distortion detection result determined by interpolation also changes. Here, as illustrated in FIG. 22, in a case where the projection plane 200 has irregularities, graphic positions of the respective colors in a projected screen are displaced even when there is no color shift attributable to the projection section 10 and the imaging section 20. For this reason, a false color shift is measured because of an interpolation error.

In contrast, in the present embodiment, the barycentric positions of the graphics of the respective colors are substantially coincident in the unit image U1 of the measurement image Dcp, and thus the red graphic Sr, the green graphic Sg, and the blue graphic Sb are rendered at the substantially same positions of the projected screen. For this reason, measurement of a false color shift is suppressed, even in a case where the projection plane 200 has irregularities and a distortion occurs in the projected screen as described above.

In addition, light passing through a lens tends to have a small amount of neighboring light due to optical properties of the lens. Hence, luminance unevenness may occur in the projected screen or the captured image, due to lens properties within the image projection apparatus 1A (the projection section 10) or the imaging section 20. Moreover, within the projected screen, an angle formed by a light ray projected from the image projection apparatus 1A and the projection plane 200 is not constant. This also becomes a factor in causing the luminance unevenness. Such luminance unevenness leads to a decline in accuracy of measuring a distortion and a color shift of the projected screen. Further, there is a case where, to avoid imaging with unintentional exposure setting, optimum exposure setting may be performed manually, not automatically. It is therefore desirable to suppress luminance unevenness on a projected screen and a captured image as much as possible.

Accordingly, it is desirable that the correction section 40 perform, in addition to the image correction based on the color shift information described above, correction of a luminance distribution attributable to lens properties within the image projection apparatus 1A (the projection section 10) or the imaging section 20. As an example, FIG. 23 schematically illustrates luminance unevenness that occurs due to lens properties. The correction makes it possible to reduce such luminance unevenness, and makes it possible to further enhance the accuracy of measuring a color shift.

As described above, in the present embodiment, the measurement image Dcp projected toward the projection plane 200 by the projection section 10 includes the plurality of unit images U1 each including the graphics of the respective plurality of colors, and the barycentric positions of the graphics of the plurality of colors are coincident in this unit image U1. This makes it possible to measure a color shift without, for example, projecting the measurement image Dcp for each of a plurality of colors and without performing imaging for each color. In particular, in a case where a projected screen is to be imaged for each color, imaging is performed while the imaging section 20 is fixed using a tripod, etc., which is poor in convenience. In contrast, it is possible to measure a color shift in one imaging by using the measurement image Dcp including the unit image U1 as described above. It is therefore possible to enhance convenience of a user.

It is to be noted that, in the foregoing embodiment, a case where the fundamental color of projection and the fundamental color of imaging are identical (R, G, and B) is assumed, but these fundamental colors may be different from each other. In a case where the fundamental color of projection and the fundamental color of imaging are different, the crosstalk of color occurs, but it is possible to identify an outline of a graphic of each color, by using a method similar to the noise-outline removal (step S16) in the flowchart in FIG. 4.

Another example of the measurement image is described below as a modification example of the foregoing embodiment. It is to be noted that the same components as those of the foregoing first embodiment are denoted by the same reference numerals, and the descriptions thereof are omitted as appropriate.

Modification Example 1

FIG. 24 illustrates a configuration of a measurement image (a measurement image Dcp1) according to a modification example 1. FIG. 25 describes a detailed configuration of a unit image (a unit image U3) illustrated in FIG. 24. In the foregoing embodiment, in the unit image U1 of the measurement image Dcp, an example is given in which the graphics of the respective colors are disposed to have a circular shape and an annular shape surrounding the circular shape, but the measurement image may have any of other various configurations. For example, as in the present modification example, a graphic of each color may include a plurality of graphics. Specifically, the unit image U3 includes two red graphics Sr11 and Sr12, two green graphics Sg11 and Sg12, as well as two blue graphics Sb11 and Sb12. These red graphics Sr11 and Sr12, green graphics Sg11 and Sg12, and blue graphics Sb11 and Sb12 each have, for example, a rectangular shape. A barycenter Gr in the red graphics Sr11 and Sr12, a barycenter Gg in the green graphics Sg11 and Sg12, as well as a barycenter Gb in the blue graphics Sb11 and Sb12 are substantially coincident.

Further, in the present modification example as well, the red graphics Sr11 and Sr12, the green graphics Sg11 and Sg12, as well as the blue graphics Sb11 and Sb12 are disposed to have at least respective portions not to be coincident as a result of parallel displacement. In other words, in the unit image U3, the red graphics Sr11 and Sr12, the green graphics Sg11 and Sg12, as well as the blue graphics Sb11 and Sb12 are identical in shape and size, but not identical in orientation. This makes it possible to measure a color shift with accuracy by precisely calculating a barycentric position, even in a case where positional displacement occurs in a graphic of a specific color. In addition, in this unit image U3, among the red graphics Sr11 and Sr12, the green graphics Sg11 and Sg12, as well as the blue graphics Sb11 and Sb12, one graphic is disposed not to be included in any other graphic as a result of parallel displacement.

Although the present disclosure has been described above with reference to the embodiment and the modification example thereof, the present disclosure is not limited to the foregoing embodiment, etc., and may be modified in a variety of ways. Further, the effects described herein are examples, and may be other effects, and may further include other effects.

For example, the present disclosure may adopt the following configurations.

(1)
An image projection apparatus including:
a measurement image that is for measurement of positional displacement between a plurality of colors serving as projection fundamental colors; and
a projection section that projects the measurement image toward a projection plane,
the measurement image having a plurality of unit images each including graphics of the respective plurality of colors, and
the graphics of the respective plurality of colors in each of the unit images having respective barycentric positions that are substantially coincident.
(2)
The image projection apparatus according to (1), further including an analysis section that calculates an amount of a color shift between the plurality of colors, on a basis of a captured image obtained by imaging of a projected screen on which the measurement image is projected.
(3)
The image projection apparatus according to (2), further including a correction section that corrects an image for projection on a basis of the amount of the color shift calculated by the analysis section.
(4)
The image projection apparatus according to any one of (1) to (3), in which the unit image has a first graphic and a second graphic that are next to each other out of the graphics of the respective plurality of colors, and
has a black region on a border between the first graphic and the second graphic.
(5)
The image projection apparatus according to any one of (1) to (4), in which
the unit image has a third graphic and a fourth graphic that form a combination that easily causes crosstalk relatively out of the graphics of the respective plurality of colors, and the third graphic and the fourth graphic are disposed to have a relatively large distance therebetween.
(6)
The image projection apparatus according to any one of (1) to (5), in which, in the unit image, the graphics of the respective plurality of colors have at least respective portions that are not to be coincident as a result of parallel displacement.
(7)
The image projection apparatus according to any one of (1) to (6), in which, in the unit image, one of the graphics of the respective plurality of colors is not to be included in any other graphic of the graphics of the respective plurality of colors as a result of parallel displacement.
(8)
The image projection apparatus according to any one of (1) to (7), in which, in the unit image,
the graphic of one of the plurality of colors has a circular shape, and
the graphic of any other color of the plurality of colors has an annular shape that surrounds the circular shape.
(9)
The image projection apparatus according to any one of (1) to (8), in which the unit images are disposed in a matrix in the measurement image.
(10)
The image projection apparatus according to (3), in which the correction section corrects a luminance distribution in the projected screen and the captured image.
(11)
The image projection apparatus according to any one of (1) to (10), in which the projection section includes a short-focus-type projection lens.
(12)
A projection imaging system including:
a projection section that projects, toward a projection plane, a measurement image that is for measurement of positional displacement between a plurality of colors serving as projection fundamental colors; and
an imaging section that images a projected screen on which the measurement image is projected,
the measurement image having a plurality of unit images each including graphics of the respective plurality of colors, and
the graphics of the respective plurality of colors in each of the unit images having respective barycentric positions that are substantially coincident.
(13)
The projection imaging system according to (12), further including an analysis section that calculates an amount of a color shift between the plurality of colors, on a basis of a captured image obtained by the imaging section.
(14)
The projection imaging system according to (13), further including a correction section that corrects an image for projection on a basis of the amount of the color shift calculated by the analysis section.
(15)
The projection imaging system according to (14), in which the correction section corrects a luminance distribution in the projected screen and the captured image.
(16)
A correction method including:
projecting, toward a projection plane, a measurement image that is for measurement of positional displacement between a plurality of colors serving as projection fundamental colors;

imaging a projected screen on which the measurement image is projected; and correcting an image to be projected, on a basis of a captured image of the projected screen, the measurement image having a plurality of unit images each including graphics of the respective plurality of colors, and the graphics of the respective plurality of colors in each of the unit images having respective barycentric positions that are substantially coincident.

This application claims the benefit of Japanese Priority Patent Application JP2016-89058 filed with the Japan Patent Office on Apr. 27, 2016, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An image projection apparatus, comprising:
    a projection section configured to project a measurement image toward a projection plane, wherein
    the measurement image is for measurement of a positional displacement between a plurality of colors that serves as projection fundamental colors,
    the measurement image has a plurality of unit images each including graphics of a respective plurality of colors,
    the graphics of the respective plurality of colors in each unit image of the plurality of unit images has respective barycentric positions that are substantially coincident, and
    each unit image of the plurality of unit images includes:
        a first graphic of the graphics of the respective plurality of colors and a second graphic of the graphics of the respective plurality of colors, and
        a black region on a border between the first graphic and the second graphic, wherein
            the first graphic and the second graphic are next to each other.

2. The image projection apparatus according to claim 1, further comprising an analysis section configured to calculate an amount of a color shift between the plurality of colors, wherein
    the amount of the color shift is calculated based on a captured image obtained by imaging of a projected screen on which the measurement image is projected.

3. The image projection apparatus according to claim 2, further comprising a correction section configured to correct an image for projection based on the amount of the color shift calculated by the analysis section.

4. The image projection apparatus according to claim 1, wherein
    each unit image further includes a third graphic of the graphics of the respective plurality of colors and a fourth graphic of the graphics of the respective plurality of colors,
    the third graphic and the fourth graphic form a combination that causes crosstalk easier relative to other graphics the graphics of the respective plurality of colors, and
    the third graphic and the fourth graphic have a relatively large distance therebetween among the graphics of the respective plurality of colors.

5. The image projection apparatus according to claim 1, wherein, in each unit image, the graphics of the respective plurality of colors have at least respective portions that are not to be coincident as a result of a parallel displacement.

6. The image projection apparatus according to claim 1, wherein, in each unit image, one of the graphics of the respective plurality of colors is not to be included in any other graphic of the graphics of the respective plurality of colors as a result of a parallel displacement.

7. The image projection apparatus according to claim 1, wherein, in each unit image, a graphic of one of the plurality of colors has a circular shape and a graphic of any other color of the plurality of colors has an annular shape that surrounds the circular shape.

8. The image projection apparatus according to claim 1, wherein the plurality of unit images are in a matrix in the measurement image.

9. The image projection apparatus according to claim 3, wherein the correction section is further configured to correct a luminance distribution in the projected screen and the captured image.

10. The image projection apparatus according to claim 1, wherein the projection section includes a short-focus-type projection lens.

11. A projection imaging system, comprising:
    a projection section configured to project a measurement image toward a projection plane, wherein
    the measurement image is for measurement of a positional displacement between a plurality of colors that serves as projection fundamental colors; and
    an imaging section configured to capture an image of a projected screen on which the measurement image is projected, wherein
    the measurement image has a plurality of unit images each including graphics of a respective plurality of colors,
    the graphics of the respective plurality of colors in each unit image of the plurality of unit images has respective barycentric positions that are substantially coincident, and
    each unit image of the plurality of unit images includes:
        a first graphic of the graphics of the respective plurality of colors and a second graphic of the graphics of the respective plurality of colors, and
        a black region on a border between the first graphic and the second graphic, wherein
            the first graphic and the second graphic are next to each other.

12. The projection imaging system according to claim 11, further comprising an analysis section configured to calculate an amount of a color shift between the plurality of colors, wherein
    the amount of the color shift is calculated based on a captured image obtained by the imaging section.

13. The projection imaging system according to claim 12, further comprising a correction section configured to correct an image for projection based on the amount of the color shift calculated by the analysis section.

14. The projection imaging system according to claim 13, wherein the correction section is further configured to correct a luminance distribution in the projected screen and the captured image.

15. A correction method, comprising:
    projecting a measurement image toward a projection plane, wherein
    the measurement image is for measurement of a positional displacement between a plurality of colors that serves as projection fundamental colors;

imaging a projected screen on which the measurement image is projected; and correcting an image to be projected based on a captured image of the projected screen, wherein the measurement image has a plurality of unit images each including graphics of a respective plurality of colors, the graphics of the respective plurality of colors in each unit image of the plurality of unit images has respective barycentric positions that are substantially coincident, and each unit image of the plurality of unit images includes:
- a first graphic of the graphics of the respective plurality of colors and a second graphic of the graphics of the respective plurality of colors, and
- a black region on a border between the first graphic and the second graphic, wherein
    the first graphic and the second graphic are next to each other.

16. An image projection apparatus, comprising:

a projection section configured to project a measurement image toward a projection plane, wherein the measurement image is for measurement of a positional displacement between a plurality of colors that serves as projection fundamental colors, the measurement image has a plurality of unit images each including graphics of a respective plurality of colors, the graphics of the respective plurality of colors in each unit image of the plurality of unit images has respective barycentric positions that are substantially coincident, each unit image includes a third graphic of the graphics of the respective plurality of colors and a fourth graphic of the graphics of the respective plurality of colors, the third graphic and the fourth graphic form a combination that causes crosstalk easier relative to other graphics the graphics of the respective plurality of colors, and the third graphic and the fourth graphic have a relatively large distance therebetween among the graphics of the respective plurality of colors.

17. An image projection apparatus, comprising:

a projection section configured to project a measurement image toward a projection plane, wherein the measurement image is for measurement of a positional displacement between a plurality of colors that serves as projection fundamental colors, the measurement image has a plurality of unit images each including graphics of a respective plurality of colors, the graphics of the respective plurality of colors in each unit image of the plurality of unit images has respective barycentric positions that are substantially coincident, and in each unit image, a graphic of one of the plurality of colors has a circular shape and a graphic of any other color of the plurality of colors has an annular shape that surrounds the circular shape.

* * * * *